(12) United States Patent
Roberge et al.

(10) Patent No.: US 12,539,704 B2
(45) Date of Patent: Feb. 3, 2026

(54) IDENTIFICATION PRINTING SYSTEM FOR AN AGRICULTURAL BALE

(71) Applicants: CNH Industrial America LLC, New Holland, PA (US); CNH Industrial Canada, Ltd., Saskatoon (CA)

(72) Inventors: Martin J. Roberge, Quebec (CA); Jonathan E. Ricketts, Coal Valley, IL (US); Niels Dybro, Muscatine, IA (US)

(73) Assignees: CNH Industrial Canada, Ltd., Saskatoon (CA); CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/647,553

(22) Filed: Apr. 26, 2024

(65) Prior Publication Data

US 2024/0359487 A1 Oct. 31, 2024

Related U.S. Application Data

(60) Provisional application No. 63/462,601, filed on Apr. 28, 2023.

(51) Int. Cl.
*A01F 15/07* (2006.01)
*B41J 3/407* (2006.01)
(Continued)

(52) U.S. Cl.
CPC ....... *B41J 3/40733* (2020.08); *A01F 15/0715* (2013.01); *B41J 13/03* (2013.01); *B41M 5/0088* (2013.01); *B65B 11/04* (2013.01); *B65B 57/00* (2013.01); *B65B 61/025* (2013.01); *A01F 2015/074* (2013.01); *A01F 2015/0745* (2013.01); *A01F 2015/076* (2013.01)

(58) Field of Classification Search
CPC .. B41J 3/40733; B41J 13/03; A01F 2015/072; A01F 2015/075; A01F 2015/076; A01F 2015/074; A01F 2015/0745; A01F 15/07; A01F 15/071; A01F 15/0715
See application file for complete search history.

(56) References Cited

U.S. PATENT DOCUMENTS 7,082,740 B2    8/2006   van der Lely
10,276,015 B2 *  4/2019   Lang ................. A01F 15/14
(Continued)

FOREIGN PATENT DOCUMENTS

CN      201371969 Y       12/2009
ES        1060086 U        7/2005
WO   WO-2021011767 A1 *   1/2021  ......... A01F 15/0715

*Primary Examiner* — Andrew M Tecco
(74) *Attorney, Agent, or Firm* — Fletcher Yoder, P.C.

(57) ABSTRACT

An identification printing system for a wrapped agricultural bale includes a controller having a memory and a processor. The controller is configured to control a bale rotation system to drive the wrapped agricultural bale to rotate within a bale carrier of a baler, control a print head to print identification information onto an outer circumferential surface of a bale wrap of the wrapped agricultural bale in multiple locations as the wrapped agricultural bale is rotating, control the bale rotation system to terminate rotation of the wrapped agricultural bale, and control an ejection system to eject the wrapped agricultural bale from the baler a target duration after terminating rotation of the wrapped agricultural bale.

20 Claims, 5 Drawing Sheets

(51) Int. Cl.
*B41J 13/03* (2006.01)
*B41M 5/00* (2006.01)
*B65B 11/04* (2006.01)
*B65B 57/00* (2006.01)
*B65B 61/02* (2006.01)

(56) References Cited

U.S. PATENT DOCUMENTS

| | | |
|---|---|---|
| 10,926,908 B2* | 2/2021 | Schlichting ............. B65B 41/16 |
| 11,312,158 B1* | 4/2022 | Bullington .......... B41J 11/00214 |
| 2010/0003118 A1* | 1/2010 | Noonan ................ B65B 25/148 |
| | | 414/757 |
| 2017/0057680 A1* | 3/2017 | Schlichting ........ G06K 7/10425 |
| 2017/0287303 A1* | 10/2017 | Lang .................. G08B 21/0275 |
| 2020/0344955 A1 | 11/2020 | Lervik et al. |
| 2021/0031624 A1* | 2/2021 | Ishikawa .................. A01F 15/08 |
| 2022/0272904 A1* | 9/2022 | Roberge ............. A01F 15/0715 |
| 2023/0403981 A1* | 12/2023 | Ponkshe ................ B41F 33/16 |
| 2024/0067377 A1* | 2/2024 | Fuchs ................ A01F 15/0715 |
| 2024/0172598 A1* | 5/2024 | Bhunya ................... A01F 15/07 |

* cited by examiner

IDENTIFICATION PRINTING SYSTEM FOR AN AGRICULTURAL BALE

BACKGROUND

The present disclosure relates generally to an identification printing system for an agricultural bale.

Agricultural balers are used to compress an agricultural product (e.g., cotton) into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale. The bale wrap may be formed from a natural material(s), such as cotton and/or hemp, a polymeric material (e.g., plastic), such as polyvinyl chloride (PVC), other suitable material(s), or a combination thereof.

BRIEF DESCRIPTION

In certain embodiments, an identification printing system for a wrapped agricultural bale includes a controller having a memory and a processor. The controller is configured to control a bale rotation system to drive the wrapped agricultural bale to rotate within a bale carrier of a baler, control a print head to print identification information onto an outer circumferential surface of a bale wrap of the wrapped agricultural bale in multiple locations as the wrapped agricultural bale is rotating, control the bale rotation system to terminate rotation of the wrapped agricultural bale, and control an ejection system to eject the wrapped agricultural bale from the baler a target duration after terminating rotation of the wrapped agricultural bale.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
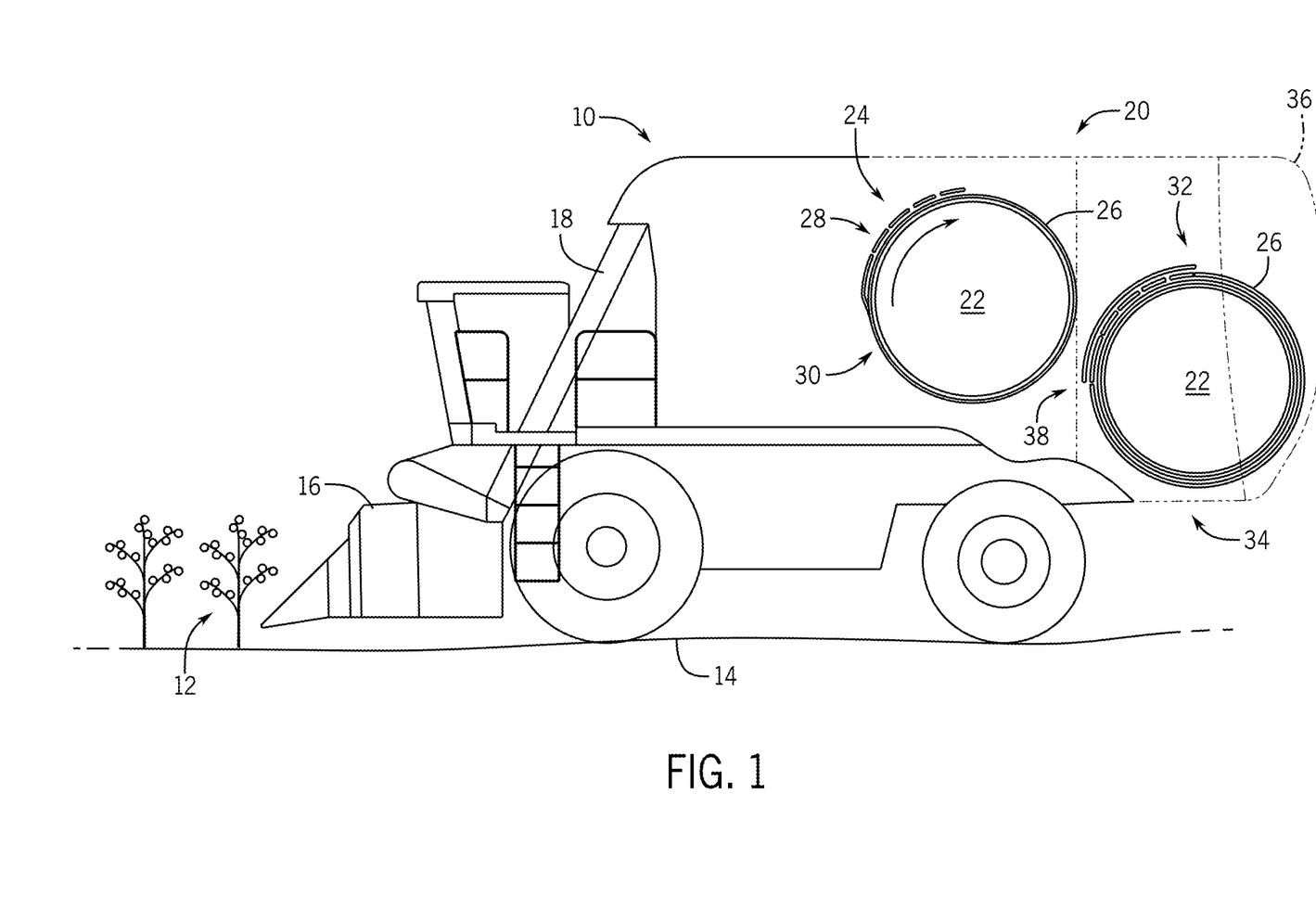
FIG. 1 is a schematic diagram of an embodiment of an agricultural system having an identification printing system.

FIG. 1 is a schematic diagram of an embodiment of an agricultural system 10 (e.g., harvester) having an identification printing system. The agricultural system 10 is configured to harvest agricultural product 12 (e.g., cotton) from a field 14 and to form the agricultural product 12 into bales (e.g., agricultural bales). For example, the agricultural system 10 includes a header 16 having drums configured to harvest the agricultural product 12 from the field 14. Additionally, the agricultural system 10 includes an air-assisted system 18 configured to move the agricultural product 12 from the drums of the header 16 to a baler 20. The baler 20 is supported by and/or mounted within or on a chassis of the agricultural system 10. The baler 20 may form the agricultural product 12 into round bales. However, in other embodiments, the baler 20 of the agricultural system 10 may form the agricultural product 12 into square bales, polygonal bales, or bales of other suitable shape(s).

After forming the agricultural product 12 into a bale 22, a bale wrapping system 24 of the agricultural system 10 wraps the bale with a bale wrap 26 to secure the agricultural product 12 within the bale 22 and to generally maintain a shape of the bale 22. In the illustrated embodiment, as the agricultural product 12 (e.g., cotton) is harvested, the agricultural product 12 flows into an accumulator 28 (e.g., bale chamber) and/or a feeding system. For example, cotton may be blown by the air-assisted system into the accumulator/bale chamber 28. The cotton is then fed into a cavity 30 of the baler 20. The baler 20 includes multiple rollers that support and/or drive rotation of one or more belts. One or more rollers are driven to rotate via a belt drive system (e.g., including electric motor(s), hydraulic motor(s), pneumatic motor(s), etc.). The belt(s) circulate around a path, and movement of the belt(s) captures the agricultural product 12 from the accumulator/housing 28 and draws the agricultural product 12 into the cavity 30, where the agricultural product 12 is gradually built up to form the bale 22.

Once the bale 22 reaches a desired size, the bale wrapping system 24 wraps the bale 22 with the bale wrap 26. The bale wrap 26 may include cotton, hemp, flax, other suitable material(s) (e.g., biodegradable material(s), natural material(s)), or a combination thereof. In certain embodiments, the bale wrap 26 may include only cotton. Additionally, the bale wrap 26 may include canvas, fabric, cloth, other suitable material(s), or a combination thereof. Furthermore, in certain embodiments, the bale wrap 26 may include plastic (e.g., polymeric material), such as polyvinyl chloride, etc.

The bale wrap 26 may be fed into contact with the bale 22 with one or more feed rollers and over a wrap guide or wrap applicator (e.g., duckbill). The wrap guide/wrap applicator is configured to move (e.g., rotate) to direct the bale wrap 26 into contact with the bale 22. The bale wrap 26 may be captured between the bale 22 and the belt(s). Accordingly, rotation of the bale 22 draws the bale wrap 26 around the bale 22, thereby wrapping the bale 22.

To secure the bale wrap 26 around the bale 22, the bale wrapping system 24 may include an adhesive system. The adhesive system may include one or more sprayers that spray an adhesive onto the bale wrap 26 (e.g., one side of the bale wrap 26). Additionally or alternatively, the sprayer(s) may spray an activator (e.g., water) onto the bale wrap 26 to activate an adhesive (e.g., water-soluble film, powder embedded within the bale wrap, etc.). Accordingly, the adhesive system 60 may create an adhesive layer on the bale wrap 26, thereby coupling the bale wrap 26 to itself, which secures the bale wrap 26 around the bale 22. For example, a first portion of the bale wrap 26 may couple (e.g., adhere) to a second portion (e.g., a backside and/or an exterior surface) of the bale wrap 26 with the adhesive provided by and/or activated by the adhesive system as the first portion overlaps the second portion. The bale wrap 26 may then be cut with a cutter or cutting system to separate additional bale wrap 26 (e.g., on a roll of bale wrap) from the bale wrap 26 surrounding the bale 22.

The cutting system may cut the bale wrap 26 to a suitable length for wrapping the bale 22. For example, the length of the bale wrap 26 may be selected based on a size of the bale 22 and a desired number of wraps of the bale wrap 26 (e.g., the number of times the bale wrap 26 wraps around a circumferential side of the bale 22). The cutting system may include a cutting mechanism, an actuation assembly coupled to the cutting mechanism, and a track. The cutting mechanism may include a knife that engages the bale wrap 26 to cut the bale wrap 26. In other embodiments, the cutting mechanism may include other suitable mechanism(s) configured to cut the bale wrap 26 (e.g., a rotary knife, a duckbill knife, a saw, a shear bar, etc.). In some embodiments, the actuation assembly is configured to move the cutting mechanism along a track to selectively drive the cutting mechanism into engagement with the bale wrap 26. In certain embodiments, the bale wrap 26 may have partially pre-cut sections (e.g., perforated sections) to facilitate cutting the bale wrap 26 by the cutting system.

The bale wrap 26 is configured to wrap around the bale 22 to secure the agricultural product 12 within the bale 22 and to generally maintain a shape of the bale 22, such as the round shape in the illustrated embodiment. In other embodiments, the shape of the bale may be rectangular, polygonal, or another suitable shape. The bale wrapping system 24 may wrap the bale 22 with the bale wrap 26 once or multiple times. For example, the bale wrap 26 may form one wrap (e.g., layer), one wrap and a portion of another wrap, two wraps, or five wraps around the bale 22. The adhesive system may spray various circumferential lengths of adhesive/activator along the bale wrap 26. For example, the adhesive system may spray along a circumferential portion of the bale wrap 26 that extends less than 25 percent, 50 percent, 75 percent, or 100 percent of the circumferential extent of the bale 22. The sprayed portion of the bale wrap 26 may also cover more than one wrap of the bale wrap 26. In some embodiments, the portion of the bale wrap 26 sprayed with the adhesive/activator may be a selected length (e.g., 1 cm, 15 cm, 30 cm, 60 cm, 90 cm, 120 cm, 150 cm, or more). Furthermore, the adhesive system may spray various widths of adhesive/activator across the bale wrap 26. For example, the adhesive system may spray across 25 percent, 50 percent, 75 percent, or 100 percent of the width of the bale wrap 26 (e.g., continuously or in sections).

After the bale 22 is wrapped with the bale wrap 26, the wrapped bale 32 (e.g., wrapped agricultural bale) is transferred to a bale carrier 34. For example, the baler 20 may include a bale transport system configured to move the wrapped bale 32 from the cavity 30 to the bale carrier 34. The wrapped bale 32 may be stored in the bale carrier 34 until the agricultural system 10 reaches a desired location for ejecting the wrapped bale 32 onto the field 14. An ejection system may then eject the wrapped bale 32 from the bale carrier 34 onto the field 14. For example, the ejection system may include one or more actuators configured to open a door 36 at the back end of the baler 20, thereby enabling the wrapped bale 32 to exit the bale carrier 34 (e.g., via rolling down a ramp to the field 14). Additionally or alternatively, the ejection system may include one or more actuators configured to drive a ram to move the wrapped bale 32 out of the baler 20 and/or to drive a ramp to rotate to a lowered position to enable the wrapped bale 32 to roll out of the baler 20.

In certain embodiments, the baler 20 includes an identification printing system 38. As discussed in detail below, the identification printing system 38 includes a controller having a memory and a processor. The controller is configured to control a bale rotation system to drive the wrapped bale 32 to rotate within the bale carrier 34 of the baler 20. The controller is also configured to control a print head of the identification printing system to print identification information onto an outer circumferential surface of the bale wrap 26 of the wrapped bale 32 in multiple locations as the wrapped bale 32 is rotating. Furthermore, the controller is configured to control the bale rotation system to terminate rotation of the wrapped bale 32 (e.g., after the printing process is complete). The controller is also configured to control the ejection system to eject the wrapped bale 32 from the baler 20 (e.g., the bale carrier 34 of the baler 20) a target duration after terminating rotation of the wrapped bale 32.

The identification information may facilitate identification and tracking of the wrapped bale 32. For example, in certain embodiments, the identification information may include a machine-readable code, such as a bar code or a quick response (QR) code. Accordingly, the identification information may enable an automated system to identify the wrapped bale 32 while the wrapped bale 32 is in the field 14 and while the wrapped bale 32 is being transported, thereby facilitating tracking of the wrapped bale 32. Because the identification information is printed in multiple locations on the outer circumferential surface of the bale wrap 26, the identification information may be visible/readable while the wrapped bale 32 is in any orientation (e.g., at least one instance of the identification information may not be positioned between the wrapped bale 32 and the field 14). Furthermore, the target duration between terminating rotation of the wrapped bale 32 and ejection of the wrapped bale 32 may enable the printed identification information (e.g., the ink forming the identification information) to dry, thereby substantially reducing or eliminating the possibility of distortion (e.g., smearing) of the identification information as the wrapped bale 32 moves (e.g., rolls) onto the field 14.

Figure 2:
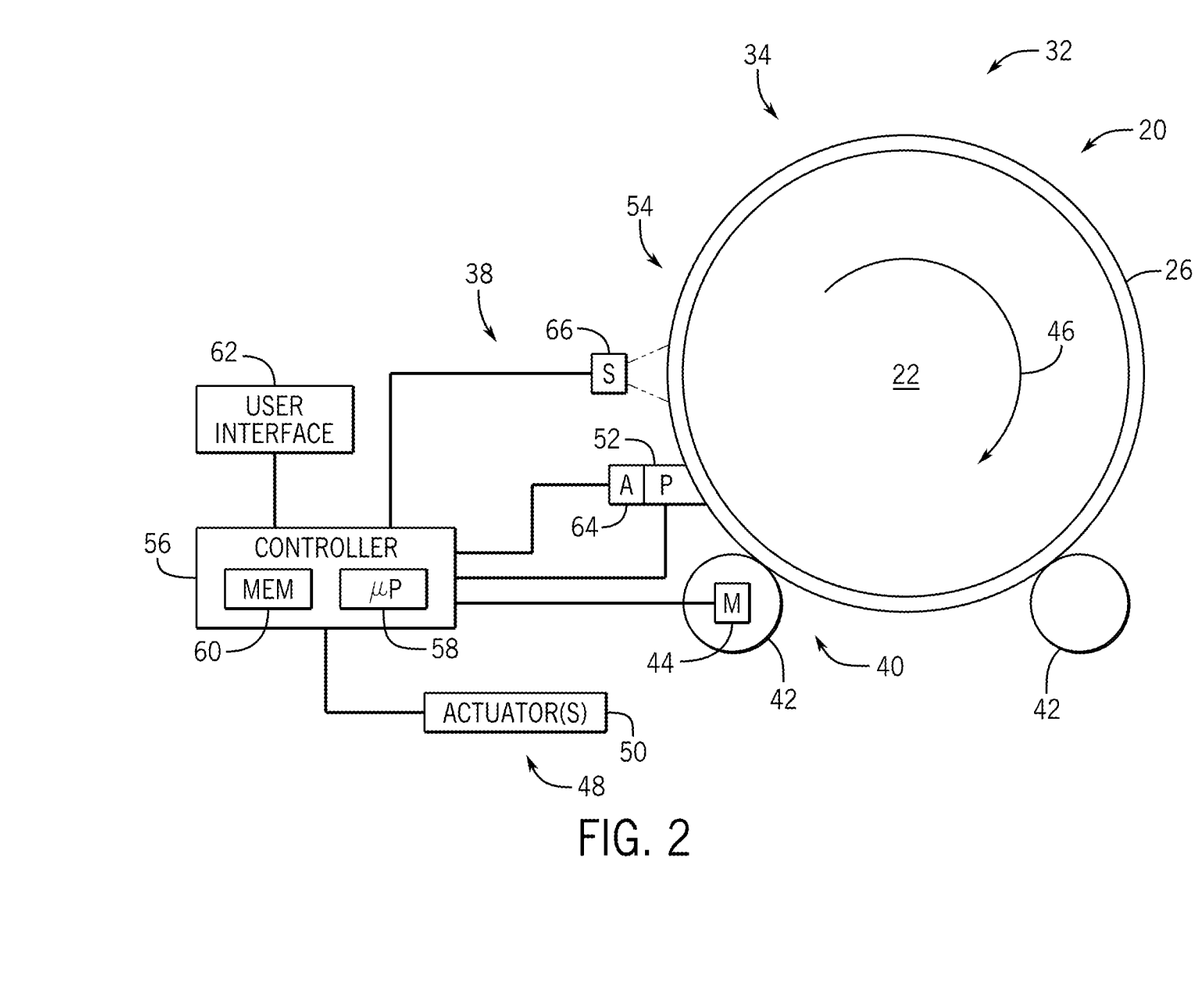
FIG. 2 is a schematic diagram of an embodiment of a bale carrier that may be employed within the agricultural system of FIG. 1.

FIG. 2 is a schematic diagram of an embodiment of a bale carrier 34 that may be employed within the agricultural system of FIG. 1. As previously discussed, after the bale 22 is wrapped with the bale wrap 26, the wrapped bale 32 (e.g., wrapped agricultural bale) is transferred to a bale carrier 34. In the illustrated embodiment, the baler 20 includes a bale rotation system 40 configured to drive the wrapped bale 32 to rotate within the bale carrier 34 of the baler 20. In the illustrated embodiment, the bale rotation system 40 includes two rollers 42 positioned at the bottom of the bale carrier 34. The rollers 42 support the wrapped bale 32 and enable the wrapped bale 32 to rotate within the bale carrier 34. While the bale rotation system 40 includes two rollers 42 in the illustrated embodiment, in other embodiments, the bale rotation system may include more or fewer rollers (e.g., 1, 3, 4, 5, 6, or more). Furthermore, each roller 42 may be positioned at any suitable location with respect to the circumference of the wrapped bale 32. While the bale rotation system 40 includes roller(s) 42 in the illustrated embodiment, in other embodiments, the bale rotation system may include other suitable device(s) (e.g., alone or in combination with the roller(s)) configured to support the wrapped bale and to enable the wrapped bale to rotate within the bale carrier, such as bearing surface(s), belt(s), other suitable device(s), or a combination thereof.

The bale rotation system 40 includes a drive system 44 configured to drive the wrapped bale 32 to rotate within the bale carrier 34, such as in a rotational direction 46. In the illustrated embodiment, the drive system 44 is configured to drive one or more rollers 42 of the bale rotation system 40 to rotate, thereby driving the wrapped bale 32 to rotate (e.g., in the rotational direction 46). In certain embodiments, the drive system 44 includes one or more electric motors, one or more hydraulic motors, one or more pneumatic motors, or a combination thereof. As discussed in detail below, the bale rotation system 40 is configured to drive the wrapped bale 32 to rotate while identification information is printed onto the bale wrap 26.

As previously discussed, the baler 20 includes an ejection system 48 configured to eject the wrapped bale 32 from the baler 20 (e.g., from the bale carrier 34 of the baler 20). In the illustrated embodiment, the bale ejection system 48 includes one or more actuators 50 configured to open the door at the back end of the baler 20. For example, the door may be pivotally coupled to a body of the baler 20 via a pivot joint positioned at a top end of the door. The actuator(s) 50 of the ejection system 48 may be configured to drive the door to pivot upwardly about the pivot joint, thereby enabling the wrapped bale 32 to exit the baler 20 (e.g., the bale carrier 34). For example, the open door may enable the wrapped bale 32 to roll down a ramp to the field. After the wrapped bale 32 is ejected from the baler 20, the actuator(s) 50 may drive the door to the closed position, thereby enabling the bale carrier 34 to receive another wrapped bale. While actuator(s) 50 configured to control the position of the door are disclosed above, in certain embodiments, the actuator(s) of the ejection system may be configured to drive/urge the wrapped bale out of the baler (e.g., alone or in combination with controlling the position of the door). For example, in certain embodiments, the actuator(s) may drive a ram to move the wrapped bale out of the baler, and/or the actuator(s) may drive a ramp to rotate to a lowered position to enable the wrapped bale to roll out of the baler.

In the illustrated embodiment, the baler 20 includes an identification printing system 38 configured to print identification information onto the bale wrap 26 of the wrapped bale 32. The identification printing system 38 includes a print head 52 configured to print the identification information onto an outer circumferential surface 54 of the bale wrap 26 of the wrapped bale 32 as the wrapped bale 32 is rotating within the bale carrier 34. The print head 52 may be configured to print onto the material that forms the outer circumferential surface 54 of the bale wrap 26. For example, in certain embodiments, the outer circumferential surface 54 of the bale wrap 26 is formed from cotton. In such embodiments, the print head 52 is configured to print onto cotton. For example, the print head 52 may include an ink jet system configured to print onto the cotton of the bale wrap 26. Furthermore, in certain embodiments, the outer circumferential surface 54 of the bale wrap 26 may be formed from hemp, flax, or another suitable natural material, or the outer circumferential surface 54 of the bale wrap 26 may be formed from plastic (e.g., polyvinyl chloride (PVC), etc.). In such embodiments, the print head 52 is configured to print on the natural material or the plastic.

In the illustrated embodiment, the identification printing system 38 includes a controller 56 having a processor 58 and a memory 60. The processor 58 (e.g., a microprocessor) may be used to execute software, such as software stored in the memory 60 for controlling components of the baler 20, such as the bale rotation system 40, the ejection system 48, and the print head 52. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) or complex instruction set (CISC) processors.

The memory 60 may include a volatile memory, such as random-access memory (RAM), and/or a nonvolatile memory, such as read-only memory (ROM). The memory 60 may store a variety of information and may be used for various purposes. For example, the memory 60 may store processor-executable instructions (e.g., firmware or software) for the processor 58 to execute, such as instructions for controlling the bale rotation system 40, the ejection system 48, and the print head 52. In certain embodiments, the controller 56 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the bale rotation system 40, the ejection system 48, and the print head 52), and any other suitable data. The processor 58 and/or the memory 60, and/or an additional processor and/or memory device, may be located in any suitable portion of the agricultural system.

Additionally, in the illustrated embodiment, the identification printing system 38 includes a user interface 62 communicatively coupled to the controller 56. The user interface 62 may be configured to provide information to an operator (e.g., indicative of the rotation rate of the wrapped bale 32 within the bale carrier 34, the position of the door, the amount of ink remaining within the print head 52, other suitable parameter(s), or a combination thereof). Additionally, the user interface 62 may be configured to enable operator interactions with components of the baler 20, such as control of the bale rotation system 40, the ejection system 48, the print head 52, or a combination thereof. For example, the user interface 62 may include a display and/or other user interaction device(s) (e.g., button(s)) configured to enable operator interactions.

In the illustrated embodiment, the controller 56 is configured to control the print head 52, the bale rotation system 40, and the ejection system 48 to effectively print the identification information onto the bale wrap 26 of the wrapped bale 32. Accordingly, the controller 56 is communicatively coupled to the bale rotation system 40 (e.g., to the drive system 44 of the bale rotation system 40), to the ejection system 48 (e.g., to the actuator(s) 50 of the ejection system 48), and to the print head 52 of the identification printing system 38. To effectively print the identification information on the bale wrap 26, the controller 56 is configured to control the bale rotation system 40 to drive the wrapped bale 32 to rotate within the bale carrier 34. For example, in certain embodiments, the controller 56 is configured to control the drive system 44 to drive the roller(s) 42 to rotate, thereby driving the wrapped bale 32 to rotate in the rotational direction 46. The controller 56 may be configured to control the bale rotation system 40 to drive the wrapped bale 32 to rotate in response to feedback from sensor(s) indicating that the wrapped bale 32 has been effectively transferred from the cavity of the baler 20 to the bale carrier 34.

Furthermore, the controller 56 is configured to control the print head 52 to print the identification information onto the outer circumferential surface 54 of the bale wrap 26 in multiple locations as the wrapped bale 32 is rotating within the bale carrier 34. For example, in certain embodiments, the identification printing system 38 may include sensor(s) configured to monitor a rotation rate of the wrapped bale 32, and the controller 56 may control the print head 52 to print the identification information in response to the rotation rate of the wrapped bale 32 (e.g., as determined based on feedback from the sensor(s)) reaching a target rotational rate. The print head 52 may include any suitable devices configured to print onto the outer circumferential surface 54 of the bale wrap 26, such as an ink jet system, a dye sublimation system, an offset printing system, other suitable device(s), or a combination thereof. In certain embodiments, the print head 52 includes a moving print element (e.g., that oscillates cross-wise to the rotational direction 46). In such embodiments, the controller 56 may coordinate the movement of the moving print element with the rotation of the wrapped bale 32 to effectively print the identification information onto the outer circumferential surface 54 of the bale wrap.

In addition, the controller 56 is configured to control the bale rotation system 40 to terminate rotation of the wrapped bale 32 within the bale carrier 34. For example, in certain embodiments, the controller 56 is configured to control the drive system 44 to terminate rotation of the roller(s) 42, thereby terminating rotation of the wrapped bale 32. The controller 56 is also configured to control the ejection system 48 to eject the wrapped bale 32 from the baler 20 (e.g., the bale carrier 34 of the baler 20) a target duration after terminating rotation of the wrapped agricultural bale 32. For example, in certain embodiments, the identification printing system 38 may include sensor(s) configured to monitor a rotation rate of the wrapped bale 32, and the controller 56 may control the ejection system 48 to eject the wrapped bale 32 the target duration after the rotation rate of the wrapped bale (e.g., as determined based on feedback from the sensor) reaches a target rotational rate (e.g., less than 1 RPM, etc.). As previously discussed, in certain embodiments, the controller 56 is configured to control the actuator(s) 50 of the ejection system 48 to drive the door to the open position, thereby enabling the wrapped bale 32 to exit the baler 20 (e.g., the bale carrier 34).

As previously discussed, the identification information may facilitate identification and tracking of the wrapped bale 32. For example, in certain embodiments, the identification information may include a machine-readable code, such as a bar code or a quick response (QR) code. Accordingly, the identification information may enable an automated system to identify the wrapped bale 32 while the wrapped bale 32 is in the field and while the wrapped bale 32 is being transported, thereby facilitating tracking of the wrapped bale 32. Furthermore, in certain embodiments, the identification information may include text (e.g., alone or in combination with the machine-readable code) that includes an identification code (e.g., unique to each wrapped bale 32), field location information (e.g., determined by the controller 56 via feedback from a spatial locating device, such as a global positioning system receiver, when the wrapped bale 32 is deposited on the field), the date and time of harvest, weather information, bale moisture at baling, a bale weight, planting information (e.g., planting date/time, fertilizer application date/time, etc.), baler operator information, fertilizer information, yield information, seed type, other suitable information, or a combination thereof. In addition, in certain embodiments, an identification code (e.g., unique to each wrapped bale 32), field location information (e.g., determined by the controller 56 via feedback from a spatial locating device, such as a global positioning system receiver, when the wrapped bale 32 is deposited on the field), the date and time of harvest, weather information, bale moisture at baling, a bale weight, planting information (e.g., planting date/time, fertilizer application date/time, etc.), baler operator information, fertilizer information, yield information, seed type, other suitable information, or a combination thereof, may be associated with the machine-readable code. For example, the controller 56 may output the machine-readable code (e.g., number corresponding to the machine-readable code) and the data associated with the identification information to a remote server, which may store the machine-readable code (e.g., number corresponding to the machine readable code) and the data associated with the identification information.

Because the identification information is printed in multiple locations on the outer circumferential surface 54 of the bale wrap 26, the identification information may be visible/readable while the wrapped bale 32 is in any orientation (e.g., at least one instance of the identification information may not be positioned between the wrapped bale 32 and the field). For example, the multiple locations may include at least three locations, and the controller 56 may be configured to control the print head 52 to print the identification information in the at least three locations at least 60 degrees away from one another with respect to a circumferential axis of the wrapped bale 32. Accordingly, the identification information may be visible/readable even if one instance of the identification information is positioned between the wrapped bale 32 and the field. While printing in at least three locations is disclosed above, in certain embodiments, the controller 56 may be configured to control the print head to print the identification information in more or fewer locations (e.g., 2, 4, 5, 6, 7, 8, or more). Furthermore, while locations positioned at least 60 degrees away from one another with respect to the circumferential axis of the wrapped bale 32 are disclosed above, in certain embodiments, the controller 56 may be configured to control the print head 52 to print the identification information at least 10 degrees, at least 20 degrees, at least 30 degrees, at least 45 degrees, at least 70 degrees, at least 90 degrees, or another suitable distance away from one another with respect to the circumferential axis of the wrapped bale 32.

In certain embodiments, the controller 56 is configured to control the bale rotation system 40 (e.g., the drive system 44 of the bale rotation system 40) to terminate rotation of the wrapped bale 32 before the identification information engages any of the rollers 42 of the bale rotation system 40. Accordingly, the possibility of distortion (e.g., smearing) of the identification information due to contact between the identification information and a roller 42 before the identification information (e.g., the ink forming the identification information) dries may be substantially reduced or eliminated. For example, in certain embodiments, the controller 56 may control the bale rotation system 40 to terminate rotation of the wrapped bale 32 after rotation of the wrapped bale 32 through a selected angle in the rotational direction 46. The selected angle may be 300 degrees, 270 degrees, 240 degrees, 210 degrees, 180 degrees, or another suitable angle (e.g., based on the position of the rollers 42 of the bale rotation system 40).

In the illustrated embodiment, the identification printing system 38 includes a print actuation system 64 communicatively coupled to the controller 56. The print actuation system 64 is configured to move the print head 52 relative to the bale wrap 26. For example, in certain embodiments, the print actuation system 64 may include a track, and the print head 52 may be movably coupled to the track. The print actuation system may also include an actuator (e.g., motor, linear actuator, etc.) configured to drive the print head 52 to move along the track to selectively engage the print head 52 with the bale wrap 26. By way of further example, the print actuation system 64 may include a linkage assembly, and the print head 52 may be coupled to the linkage assembly. The print actuation system may also include an actuator (e.g., motor, linear actuator, etc.) configured to selectively drive the linkage assembly to move the print head 52 into engagement with the bale wrap 26. In certain embodiments, the controller 56 is configured to control the print actuation system 64 to drive the print head 52 into engagement with the bale wrap 26 before controlling the print head 52 to print the identification information onto the outer circumferential surface 54 of the bale wrap 26. For example, the print actuation system 64 may move the print head 52 from a first position, which enables the wrapped bale 32 to move from the bale wrapping cavity to the bale carrier 34, to a second position, in which the print head 52 is engaged with the outer circumferential surface 54 of the bale wrap 26. Furthermore, in certain embodiments, the controller 56 is configured to control the print actuation system 64 to drive the print head 52 to disengage the bale wrap 26 (e.g., after controlling the bale rotation system 40 to terminate rotation of the wrapped bale 32). For example, the print actuation system 64 may move the print head 52 from the second position to the first position, thereby facilitating ejection of the wrapped bale 32 from the baler 20 and/or enabling a subsequent wrapped bale to move from the bale wrapping cavity to the bale carrier 34.

Furthermore, the target duration between terminating rotation of the wrapped bale 32 and ejection of the wrapped bale 32 may enable the printed identification information to dry, thereby substantially reducing or eliminating the possibility of distortion (e.g., smearing) of the identification information as the wrapped bale 32 moves (e.g., rolls) onto the field. For example, in certain embodiments, the target duration may be stored within the memory 60 of the controller 56 and/or input via the user interface 62. By way of example, the target duration may be 1 minute, 1.5 minutes, 2 minutes, 2.5 minutes, 3 minutes, or another suitable duration.

In certain embodiments, the controller 56 is configured to determine the target duration via machine learning. For example, the controller 56 may use feedback from the operator to train the machine learning process. For example, after the wrapped bale 32 is disposed on the field, an operator may inspect the printed identification information on the wrapped bale 32. If the printed identification information is distorted, the operator may enter the presence of the distortion or the degree of distortion into the user interface 62. The controller 56 may then determine a target duration that substantially reduces or eliminates the possibility of distortion (e.g., smearing) of the identification information using the machine learning process. In certain embodiments, the machine learning process may generate different target durations (e.g., as represented by table(s), empirical formula(s), curve fit(s), etc.) that vary based on ink type, environmental conditions (e.g., precipitation, humidity, temperature, etc.), ground speed of the agricultural system, other suitable parameters, or a combination thereof. Furthermore, in certain embodiments, the controller 56 may be configured to determine the target duration based on ink type, environmental conditions (e.g., precipitation, humidity, temperature, etc.), ground speed of the agricultural system, other suitable parameters, or a combination thereof.

In the illustrated embodiment, the identification printing system 38 includes a sensor 66 communicatively coupled to the controller 56 and configured to output a sensor signal indicative of the identification information. For example, the sensor 66 may include a camera configured to output the sensor signal indicative of a visual representation of the identification information (e.g., in embodiments in which the identification information includes a QR code). Additionally or alternatively, the sensor 66 may include a laser scanner configured to output the sensor signal indicative of a numerical value associated with the scanned identification information (e.g., in embodiments in which the identification information includes a bar code). The controller 56 is configured to verify the accuracy of the identification information based on the sensor signal. For example, if the identification information is distorted (e.g., smeared), not present, too light to observe, or incorrect, the controller 56 may output an output signal indicative of the inaccuracy of the identification information. The controller 56 may output the output signal to the user interface 62, and the user interface 62, in turn, may inform the operator of the inaccurate identification information. While the identification printing system 38 includes the sensor 66 in the illustrated embodiment, in other embodiments, the sensor may be omitted.

In certain embodiments, the baler includes a fluid applicator configured to apply a fluid treatment (e.g., soya wax, cotton wax, sea weed, biodegradable plastic) or a fluid activator (e.g., water) to the bale wrap. The fluid applicator may include any suitable device(s) configured to apply the fluid treatment/activator, such as a spray nozzle, a liquid application nozzle, an atomizer, a pump, other suitable device(s), or a combination thereof. The fluid treatment is configured to block water penetration into the bale, thereby substantially protecting the bale from environmental moisture (e.g., rain, dew, etc.). Furthermore, the fluid activator is configured to activate a particulate treatment within the bale wrap. The activated particulate treatment is configured to block water penetration into the bale, thereby substantially protecting the bale from environmental moisture (e.g., rain, dew, etc.). In certain embodiments, the controller is configured to control the fluid applicator to apply the fluid treatment/activator after the identification information (e.g., ink forming the identification information) dries and before the controller controls the ejection system to eject the wrapped bale. For example, the controller may be configured to terminate rotation of the wrapped bale, restart rotation of the bale a first target duration later, apply the fluid treatment/activator while the wrapped bale is rotating, terminate rotation of the wrapped bale, and eject the wrapped bale a second target duration later. The first target duration may correspond to the target duration disclosed above, and the second target duration may correspond to a time sufficient for the fluid treatment/activator to dry.

While printing the identification information onto the bale wrap 26 while the wrapped bale 32 is in the bale carrier 34 is disclosed above, in certain embodiments, the identification printing system may be configured to print the identification information onto the bale wrap while the wrapped bale is in the bale wrapping cavity. In such embodiments, the print head and, in certain embodiments, the print actuation system, may be located within the bale wrapping cavity. For example, after the bale wrapping process is complete and the wrapped bale is rotating within the cavity, the controller may control the print head to print the identification information onto the outer circumferential surface of the bale wrap. By way of further example, during the bale wrapping process, the controller may control the print head to print the identification information onto an inner wrap of the bale wrap. The bale wrapping process may continue after the identification information is printed onto the bale wrap, such that at least one wrap of the bale wrap is disposed over the identification information, thereby at least partially protecting the identification information from the environment. In such embodiments, the at least one wrap of the bale wrap disposed over the identification information may be substantially transparent. In embodiments in which the identification information is printed while the bale is in the bale wrapping cavity, the print head may print the identification information with a material (e.g., ink) that dries before the identification information engages the belt(s).

While printing the identification information onto the bale wrap 26 while the wrapped bale 32 is rotating is disclosed above, in certain embodiments, the identification printing system is configured to print the identification information onto the bale wrap in multiple locations while the wrapped bale is stationary (e.g., not rotating). For example, in certain embodiments, the identification printing system may include multiple print heads, each configured to engage the bale wrap at a respective position along the circumferential axis of the wrapped bale. For example, the print actuation system may selectively drive each print head into engagement with the bale wrap. Furthermore, in certain embodiments, the print actuation system may include a single print head configured to move to multiple locations along the circumferential axis of the wrapped bale, thereby enabling the print head to print in multiple locations on the circumferential surface (e.g., the outer circumferential surface) of the bale wrap. For example, the print actuation system may include a track, an arm, other suitable device(s), or a combination thereof, configured to move the print head to multiple locations on the circumferential surface of the bale wrap. In embodiments in which the identification information is printed while the bale is stationary (e.g., not rotating), the print head may be located within the bale wrapping cavity (e.g., for printing the identification information while the wrapped bale is in the bale wrapping cavity), or the print head may be located within the bale carrier (e.g., for printing the identification information while the wrapped bale is in the bale carrier).

Furthermore, in certain embodiments, the bale wrap may cover a portion of each axial side of the bale. For example, during the bale wrapping process, lateral shoulders of the bale wrap may fold over respective axial sides of the bale, thereby forming a bale wrap that covers the entire circumferential side and a portion of each axial side of the bale. As a result, the effectiveness of the bale wrap in maintaining the shape of the bale may be enhanced, and the bale may be provided with enhanced protection from the environment (e.g., as compared to a bale wrap that only covers the circumferential side of the bale). In embodiments in which shoulders of the bale wrap partially cover the respective axial sides of the bale, the identification printing system may be configured to print the identification information onto one or both shoulders (e.g., alone or in combination with printing on the circumferential surface, such as the outer circumferential surface, of the bale wrap). In embodiments in which the print head is located within the bale carrier, the print head may print the identification information onto at least one shoulder as the wrapped bale rotates within the bale carrier. Furthermore, in embodiments in which the print head is located within the bale wrapping cavity, the print head may print the identification onto at least one shoulder during or after the bale wrapping process.

Figure 3:
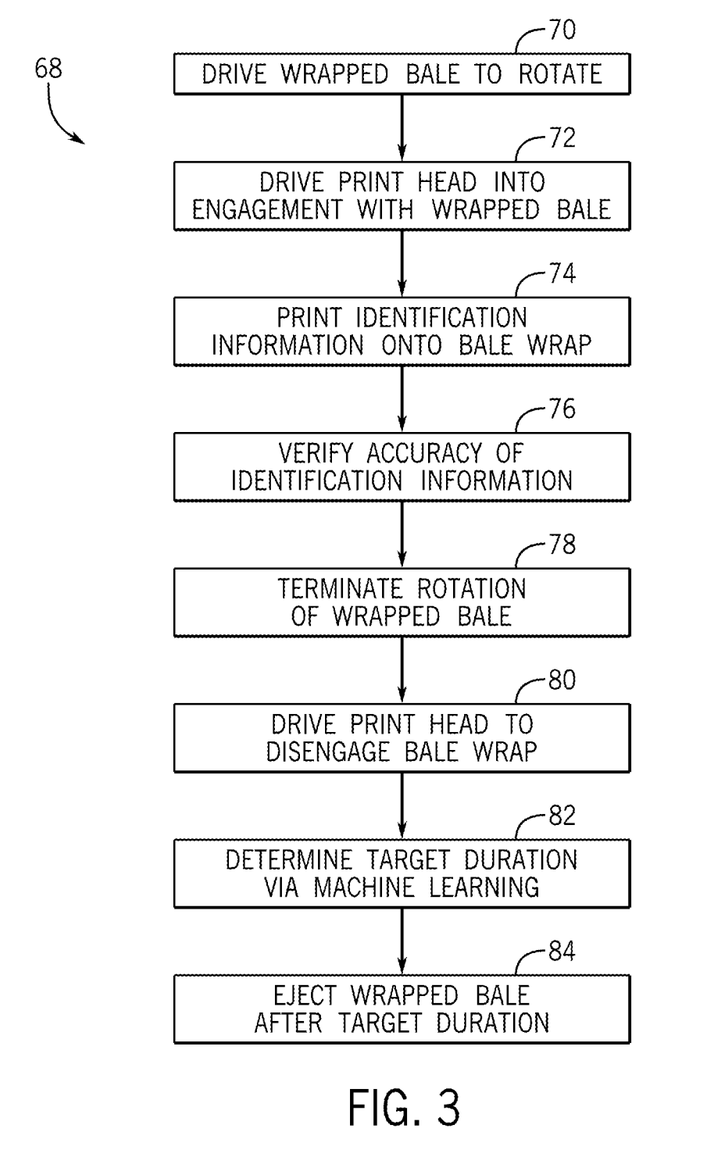
FIG. 3 is a flowchart of an embodiment of a method for printing identification information onto a wrapped bale.

FIG. 3 is a flowchart of an embodiment of a method 68 for printing identification information onto a wrapped bale. The method 68 may be performed by the controller disclosed above with referenced to FIG. 2 or any other suitable controller(s). Furthermore, the steps of the method 68 may be performed in the order disclosed herein or in any other suitable order. For example, certain steps of the method may be performed concurrently. In addition, in certain embodiments, at least one of the steps of the method 68 may be omitted.

In the illustrated embodiment, the method 68 includes controlling the bale rotation system to drive the wrapped bale to rotate within the bale carrier of the baler, as represented by block 70. In certain embodiments, the drive system of the bale rotation system may be controlled to drive the roller(s) of the bale rotation system to rotate, thereby driving the wrapped bale to rotate in the rotational direction. Furthermore, in certain embodiments (e.g., in embodiments including the print actuation system), the method 68 includes controlling the print actuation system to drive the print head into engagement with the bale wrap, as represented by block 72. For example, the print actuation system may move the print head from a first position, which enables the wrapped bale to move from the bale wrapping cavity to the bale carrier, to a second position, in which the print head is engaged with the outer circumferential surface of the bale wrap.

The method 68 also includes controlling the print head to print identification information onto the outer circumferential surface of the bale wrap of the wrapped bale in multiple locations as the wrapped bale is rotating, as represented by block 74. In certain embodiments (e.g., in embodiments including the print actuation system), the print head may be driven into engagement with the bale wrap before the print head prints the identification information onto the bale wrap. As previously discussed, the identification information may include machine-readable code, such as a QR code or a bar code. In certain embodiments, the method 68 includes verifying the accuracy of the identification information based on feedback from a sensor, as represented by block 76. For example, the sensor may include a camera configured to output a sensor signal indicative of a visual representation of the identification information (e.g., in embodiments in which the identification information includes a QR code). Additionally or alternatively, the sensor may include a laser scanner configured to output a sensor signal indicative of a numerical value associated with the scanned identification information (e.g., in embodiments in which the identification information includes a bar code).

In addition, the method 68 includes controlling the bale rotation system to terminate rotation of the wrapped bale, as represented by block 78. For example, the drive system of the bale rotation system may be controlled to terminate rotation of the roller(s), thereby terminating rotation of the wrapped bale. In certain embodiments (e.g., in embodiments including the print actuation system), the method 68 includes controlling the print actuation system to drive the print head to disengage the bale wrap (e.g., after controlling the bale rotation system to terminate rotation of the wrapped bale), as represented by block 80. For example, the print actuation system may move the print head from the second position to the first position, thereby facilitating ejection of the wrapped bale from the baler and/or enabling a subsequent wrapped bale to move from the bale wrapping cavity to the bale carrier.

In certain embodiments, the method 68 includes determining a target duration via machine learning, as represented by block 82. For example, as previously discussed, a target duration that substantially reduces or eliminates the possibility of distortion (e.g., smearing) of the identification information due to contact between the identification information and the field may be determined using the machine learning process. In certain embodiments, the step of determining the target duration via machine learning may be omitted. In such embodiments, the target duration may be manually entered. Furthermore, the method 68 includes controlling the ejection system to eject the wrapped agricultural bale from the baler the target duration after terminating rotation of the wrapped bale, as represented by block 84. For example, actuator(s) of the bale ejection system may be controlled to open the door of the baler, thereby enabling the wrapped bale to exit the baler.

Figure 4:
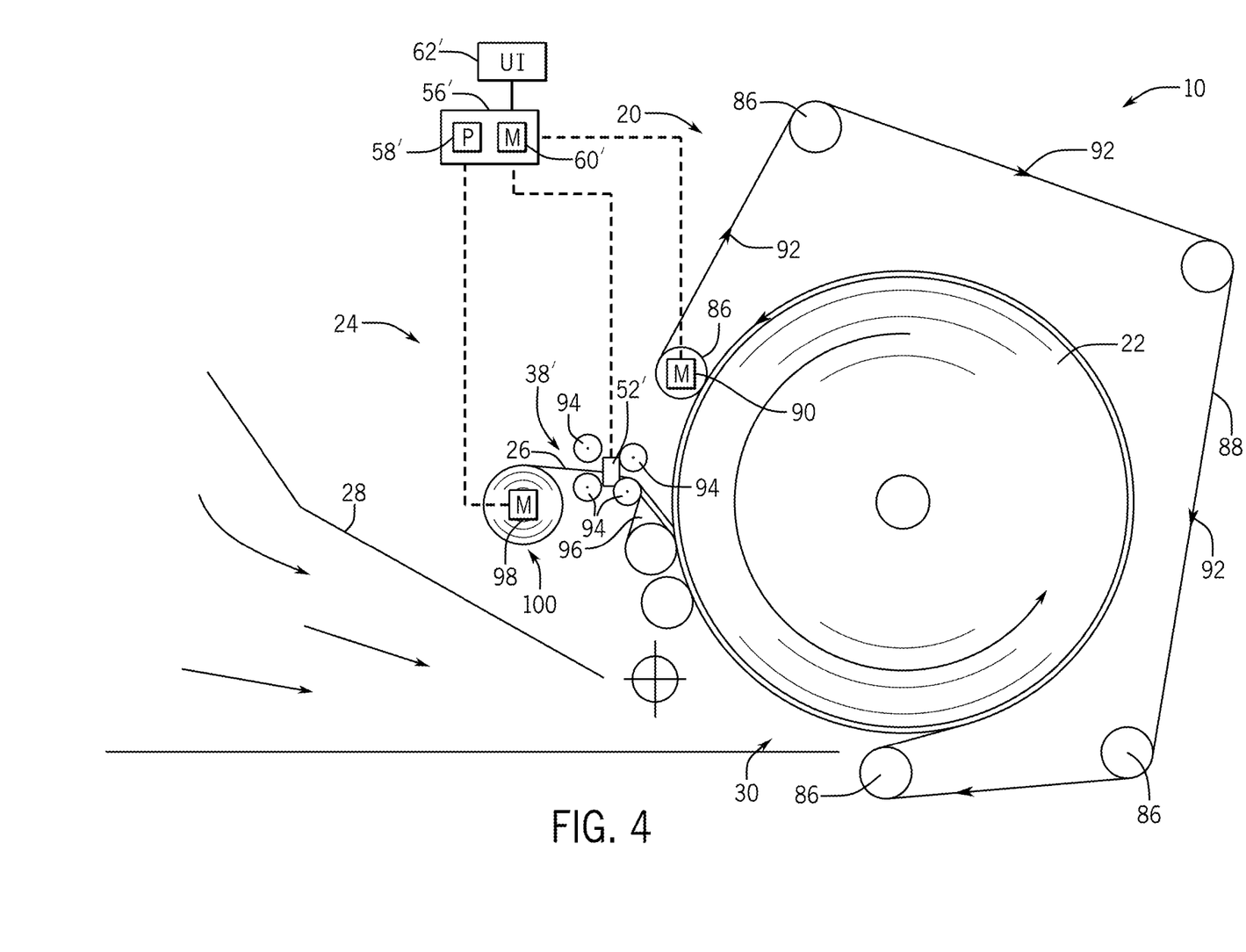
FIG. 4 is a schematic diagram of an embodiment of a bale wrapping system that may be employed within the agricultural system of FIG. 1.

FIG. 4 is a schematic diagram of an embodiment of a bale wrapping system 24 that may be employed within the agricultural system of FIG. 1. As previously discussed, after forming the agricultural product into the bale 22, the bale wrapping system 24 wraps the bale 22 with the bale wrap 26 to secure the agricultural product within the bale 22 and to generally maintain the shape of the bale 22. In the illustrated embodiment, as the agricultural product (e.g., cotton) is harvested, the agricultural product flows into the accumulator 28 (e.g., bale chamber) and/or the feeding system. For example, cotton may be blown by the air-assisted system into the accumulator/bale chamber 28. The cotton is then fed into the cavity 30 of the baler 20. The baler 20 includes multiple rollers 86 that support and/or drive rotation of one or more belts 88 (e.g., bale-forming belts). For example, one or more rollers 86 engage the belt(s) 88, which enable the belt(s) 88 to move along a path defined by the rollers 86 and the bale 22. One or more rollers 86 are driven to rotate via a belt drive system 90 (e.g., including electric motor(s), hydraulic motor(s), pneumatic motor(s), etc.). The belt(s) 88 circulate around the path defined by the rollers 86 and the bale 22, as indicated by arrows 92. Movement of the belt(s) 88 captures the agricultural product from the accumulator 28 and draws the agricultural product into the cavity 30, where the agricultural product is gradually built up to form the bale 22. As the agricultural product builds within the cavity 30, one or more of the rollers 86 may move radially outward to accommodate the increasing size of the bale 22. For example, the roller(s) 86 configured to move radially outwardly may be part of a tensioning system that establishes a desired tension of the belt(s) 88 to establish a desired density of the bale 22.

Once the bale 22 reaches a desired size, the bale wrapping system 24 wraps the bale 22 with the bale wrap 26. The bale wrap 26 may include cotton, hemp, flax, other suitable material(s) (e.g., biodegradable material(s), natural material(s)), or a combination thereof. In certain embodiments, the bale wrap 26 may include only cotton. Additionally, the bale wrap 26 may include canvas, fabric, cloth, other suitable material(s), or a combination thereof. Furthermore, in certain embodiments, the bale wrap 26 may include plastic (e.g., polymeric material), such as polyvinyl chloride, etc.

The bale wrap 26 is fed into contact with the bale 22 with one or more feed rollers 94 and over a wrap guide or wrap applicator 96 (e.g., duckbill). The wrap guide/wrap applicator 96 is configured to move (e.g., rotate) to direct the bale wrap 26 into contact with the bale 22. The bale wrap 26 may be captured between the bale 22 and the belt(s) 88. Accordingly, rotation of the bale 22 draws the bale wrap 26 around the bale 22, thereby wrapping the bale 22.

In the illustrated embodiment, the baler 20 includes a bale wrap shaft drive system 98 (e.g., including electric motor(s), hydraulic motor(s), pneumatic motor(s), etc.), which is coupled to a shaft of a bale wrap assembly 100 and configured to drive the shaft to rotate. While the bale wrap shaft drive system 98 is coupled to the shaft of the bale wrap assembly 100 in the illustrated embodiment, in other embodiments, the bale wrap shaft drive system may be coupled to one or more feed rollers 94 and configured to drive the feed roller(s) 94 to rotate, thereby driving the bale wrap 26 to move toward the bale 22, which drives the shaft of the bale wrap assembly 100 to rotate. The bale wrap assembly 100 includes the shaft and the bale wrap 26 disposed about the shaft. The bale wrap shaft drive system 98 may be activated to begin feeding the bale wrap 26 toward the bale 22. In some embodiments, the wrap guide 96 (e.g., duckbill) may be actuated (e.g., rotated), which drives the bale wrap 26 into contact with the bale 22. As previously discussed, the bale wrap 26 is captured between the bale 22 and the belt(s) 88. Accordingly, rotation of the belt(s) 88 draws the bale wrap 26 around the bale 22. Furthermore, in certain embodiments, the bale wrapping system 24 may include an adhesive system having one or more sprayers that spray an adhesive onto the bale wrap 26 and/or an activator (e.g., water) onto the bale wrap 26 to activate an adhesive (e.g., water-soluble film, powder embedded within the bale wrap, etc.), as disclosed above with reference to FIG. 1. In addition, in certain embodiments, the bale wrapping system 24 may include a cutting system configured to separate the bale wrap 26 disposed about the shaft of the bale wrap assembly 100 from the bale wrap 26 surrounding the bale 22, as disclosed above with reference to FIG. 1.

In the illustrated embodiment, the baler 20 includes another embodiment of an identification printing system 38'. The identification printing system 38' includes one or more print heads 52' positioned between the bale wrap assembly 100 and the bale 22. As previously discussed, the bale wrap assembly 100 is configured to provide the bale wrap 26 to the bale wrapping system 24. Furthermore, as previously discussed, the bale wrapping system 24 is configured to wrap the bale 22 with the bale wrap 26. The print head(s) 52' are configured to print identification information unto a portion of the bale wrap 26 after the portion of the bale wrap 26 disengages the shaft of the bale wrap assembly 100 and before the portion of the bale wrap 26 engages the bale 22. As previously discussed, the identification information may facilitate identification and tracking of the wrapped bale 32.

Furthermore, the print head(s) 52' may be configured to print onto the material that forms the bale wrap 26. For example, in certain embodiments, the bale wrap 26 is formed from cotton. In such embodiments, each print head 52' is configured to print onto cotton. For example, each print head 52' may include an ink jet system configured to print onto the cotton of the bale wrap 26. Furthermore, in certain embodiments, the bale wrap 26 may be formed from hemp, flax, or another suitable natural material, or the bale wrap 26 may be formed from plastic (e.g., polyvinyl chloride (PVC), etc.). In such embodiments, each print head 52' is configured to print on the natural material or the plastic. In addition, each print head 52' may print the identification information with a material (e.g., ink) that dries before the identification information engages the belt(s) 88, thereby substantially reducing or eliminating the possibility of the identification information becoming distorted (e.g., smeared) due to contact between the identification information and the belt(s) 88.

In the illustrated embodiment, the identification printing system 38' includes a controller 56' having a processor 58' and a memory 60'. The processor 58' (e.g., a microprocessor) may be used to execute software, such as software stored in the memory 60' for controlling components of the baler 20, such as the belt drive system 90, the bale wrap shaft drive system 98, and the print head(s) 52'. Moreover, the processor 58' may include multiple microprocessors, one or more "general-purpose" microprocessors, one or more special-purpose microprocessors, and/or one or more application specific integrated circuits (ASICS), or some combination thereof. For example, the processor 58' may include one or more reduced instruction set (RISC) or complex instruction set (CISC) processors.

The memory 60' may include a volatile memory, such as random-access memory (RAM), and/or a nonvolatile memory, such as read-only memory (ROM). The memory 60' may store a variety of information and may be used for various purposes. For example, the memory 60' may store processor-executable instructions (e.g., firmware or software) for the processor 58' to execute, such as instructions for controlling the belt drive system 90, the bale wrap shaft drive system 98, and the print head(s) 52'. In certain embodiments, the controller 56' may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the belt drive system 90, the bale wrap shaft drive system 98, and the print head(s) 52'), and any other suitable data. The processor 58' and/or the memory 60', and/or an additional processor and/or memory device, may be located in any suitable portion of the agricultural system.

Additionally, in the illustrated embodiment, the identification printing system 38' includes a user interface 62' communicatively coupled to the controller 56'. The user interface 62' may be configured to provide information to an operator (e.g., indicative of the rotation rate of the bale 22 within the cavity 30, the rotation rate of the shaft of the bale wrap assembly 100, the amount of ink remaining within the print head(s) 52', other suitable parameter(s), or a combination thereof). Additionally, the user interface 62' may be configured to enable operator interactions with components of the baler 20, such as control of the belt drive system 90, the bale wrap shaft drive system 98, and the print head(s) 52', or a combination thereof. For example, the user interface 62' may include a display and/or other user interaction device(s) (e.g., button(s)) configured to enable operator interactions.

In the illustrated embodiment, the controller 56' is configured to control the belt drive system 90, the bale wrap shaft drive system 98, and the print head(s) 52'. Accordingly, the controller 56' is communicatively coupled to the belt drive system 90, the bale wrap shaft drive system 98, and the print head(s) 52'. The controller 56' is configured to control the print head(s) 52' to print the identification information onto the bale wrap 26 (e.g., in multiple locations) as the bale wrap 26 is moving between the bale wrap assembly 100 and the bale 22. For example, in certain embodiments, the identification printing system 38' may include sensor(s) configured to monitor the speed of the bale wrap 26 toward the bale 22, and the controller 56' may control the print head(s) 52' to print the identification information based on the speed of the bale wrap 26 (e.g., as determined based on feedback from the sensor(s)). Each print head 52' may include any suitable device(s) configured to print onto the bale wrap 26, such as an ink jet system, a dye sublimation system, an offset printing system, other suitable device(s), or a combination thereof. In certain embodiments, each print head 52' includes a moving print element (e.g., that oscillates cross-wise to the direction of movement of the bale wrap 26). In such embodiments, the controller 56' may coordinate the movement of the moving print element(s) with the movement of the wrapped bale to effectively print the identification information onto the bale wrap.

As previously discussed, the identification information may facilitate identification and tracking of the wrapped bale. For example, in certain embodiments, the identification information may include a machine-readable code, such as a bar code or a quick response (QR) code. Accordingly, the identification information may enable an automated system to identify the wrapped bale while the wrapped bale is in the field and while the wrapped bale is being transported, thereby facilitating tracking of the wrapped bale. Furthermore, in certain embodiments, the identification information may include text (e.g., alone or in combination with the machine-readable code) that includes an identification code (e.g., unique to each wrapped bale), field location information (e.g., determined by the controller 56' via feedback from a spatial locating device, such as a global positioning system receiver, when the wrapped bale is deposited on the field), the date and time of harvest, weather information, bale moisture at baling, a bale weight, planting information (e.g., planting date/time, fertilizer application date/time, etc.), baler operator information, fertilizer information, yield information, seed type, other suitable information, or a combination thereof. In addition, in certain embodiments, an identification code (e.g., unique to each wrapped bale), field location information (e.g., determined by the controller 56' via feedback from a spatial locating device, such as a global positioning system receiver, when the wrapped bale is deposited on the field), the date and time of harvest, weather information, bale moisture at baling, a bale weight, planting information (e.g., planting date/time, fertilizer application date/time, etc.), baler operator information, fertilizer information, yield information, seed type, other suitable information, or a combination thereof, may be associated with the machine-readable code. For example, the controller 56' may output the machine-readable code (e.g., number corresponding to the machine-readable code) and the data associated with the identification information to a remote server, which may store the machine-readable code (e.g., number corresponding to the machine readable code) and the data associated with the identification information.

As previously discussed, the identification information may include a bar code. In certain embodiments, at least one print head 52' is configured to print the bar code along a length of the bale wrap 26, such that the bars of the bar code are spaced apart from one another along the length of the bale wrap 26 (e.g., along the direction of movement of the bale wrap 26 from the bale wrap assembly 100 toward the bale 22). Accordingly, the bar code may be readable by a laser scanner even as the bale wrap stretches in a lateral direction and/or distorts. However, in other embodiments, at least one print head 52' may be configured to print the bar code along a width of the bale wrap. For example, in certain embodiments, print head(s) 56' may print bar codes along the length of the bale wrap 26 and along the width of the bale wrap 26.

The print head(s) 52' are configured to print the identification information onto the bale wrap 26, such that the identification information is visible/readable on the wrapped bale. In certain embodiments, one or more print heads 52' are arranged to print the identification information onto the bale wrap 26, such that the identification information appears on an outwardly-facing surface of the bale wrap 26 when the bale wrap 26 is wrapped around the bale 22. For example, the controller 56' may control the print head(s) 52' to print the identification information onto the bale wrap 26, such that the identification information appears on an outer surface (e.g., outer circumferential surface and/or outer shoulder surface) of the bale wrap 26 when the bale wrap 26 is wrapped around the bale 22. By way of further example, the controller 56' may control the print head(s) 52' to print the identification information onto the bale wrap 26, such that the identification information appears on an outwardly-facing surface of an inner wrap (e.g., outwardly-facing inner circumferential surface and/or outwardly-facing inner shoulder surface) of the bale wrap 26 when the bale wrap 26 is wrapped around the bale 22. The bale wrapping process may continue after the identification information is printed onto the bale wrap 26, such that at least one wrap of the bale wrap 26 is disposed over the identification information, thereby at least partially protecting the identification information from the environment and, for identification information printed on a circumferential surface, from contact with the belt(s). To facilitate viewing/reading the identification information, the at least one wrap of the bale wrap 26 disposed over the identification information may be substantially transparent. In addition, in certain embodiments, one or more print heads 52' are arranged to print the identification information onto the bale wrap 26, such that the identification information appears on an inwardly-facing surface of the bale wrap 26 when the bale wrap 26 is wrapped around the bale 22. For example, the controller 56' may control the print head(s) 52' to print the identification information onto the bale wrap 26, such that the identification information appears on an inwardly-facing surface (e.g., inwardly-facing circumferential surface and/or inwardly-facing shoulder surface) of one wrap of the bale wrap 26 that faces another wrap of the bale wrap 26 (e.g., such that the identification information is disposed between the two wraps). Accordingly, the bale wrap 26 at least partially protects the identification information from the environment and, for identification information printed on a circumferential surface, from contact with the belt(s). To facilitate viewing/reading the identification information, the wrap(s) of the bale wrap 26 positioned between the identification information and the outer surface of the bale wrap 26 may be substantially transparent.

Furthermore, in certain embodiments, the print head(s) 52' are configured to print the identification information in multiple locations along the length of the bale wrap, such that the identification information is positioned in multiple locations along a circumferential surface of the bale wrap 26 when the bale wrap is wrapped around the bale. As previously discussed, the print head(s) 52' are configured to print the identification information onto a portion of the bale wrap 26 after the portion of the bale wrap disengages the shaft of the bale wrap assembly 100 and before the portion of the bale wrap 26 engages the bale 22. Accordingly, to print the identification information in multiple locations along the length of the bale wrap, the controller 56' may control the print head(s) 52' to print the identification information onto multiple portions. Because the identification information is printed in multiple locations on the circumferential surface of the bale wrap 26, the identification information may be visible/readable while the wrapped bale is in any orientation (e.g., at least one instance of the identification information may not be positioned between the wrapped bale and the field).

As discussed in detail below, in certain embodiments, the identification printing system 38' includes multiple print heads 52' distributed across a width of the bale wrap 26. Accordingly, the identification information may be printed in multiple locations across the width of the bale wrap 26, thereby enhancing the visibility/readability of the identification information. For example, in certain embodiments, the identification printing system 38' may include a first print head 52' configured to print the identification information onto the bale wrap 26, such that the identification information is located on a circumferential surface (e.g., outer circumferential surface) of the bale wrap 26 when the bale wrap is wrapped around the bale. In addition, the identification printing system 38' may include a second print head 52' configured to print the identification information onto the bale wrap 26, such that the identification information is located on a shoulder (e.g., outer shoulder surface) of the bale wrap 26 when the bale wrap is wrapped around the bale. Because the identification information is located on the circumferential surface of the wrapped bale and on the shoulder of the wrapped bale, the identification information may be visible/readable from multiple positions of the viewer/reader.

In certain embodiments, the identification printing system 38' may include a sensor communicatively coupled to the controller 56' and configured to output a sensor signal indicative of the identification information. For example, the sensor may include a camera configured to output the sensor signal indicative of a visual representation of the identification information (e.g., in embodiments in which the identification information includes a QR code). Additionally or alternatively, the sensor may include a laser scanner configured to output the sensor signal indicative of a numerical value associated with the scanned identification information (e.g., in embodiments in which the identification information includes a bar code). The sensor may be located downstream from the belt(s), such that the sensor monitors the identification information after the identification information has contacted the belt(s). The controller 56' is configured to verify the accuracy of the identification information based on the sensor signal. For example, if the identification information is distorted (e.g., smeared), not present, too light to observe, or incorrect, the controller 56' may output an output signal indicative of the inaccuracy of the identification information. The controller 56' may output the output signal to the user interface, and the user interface, in turn, may inform the operator of the inaccurate identification information. While an identification printing system 38' including a sensor is disclosed above, in certain embodiments, the sensor may be omitted.

Figure 5:
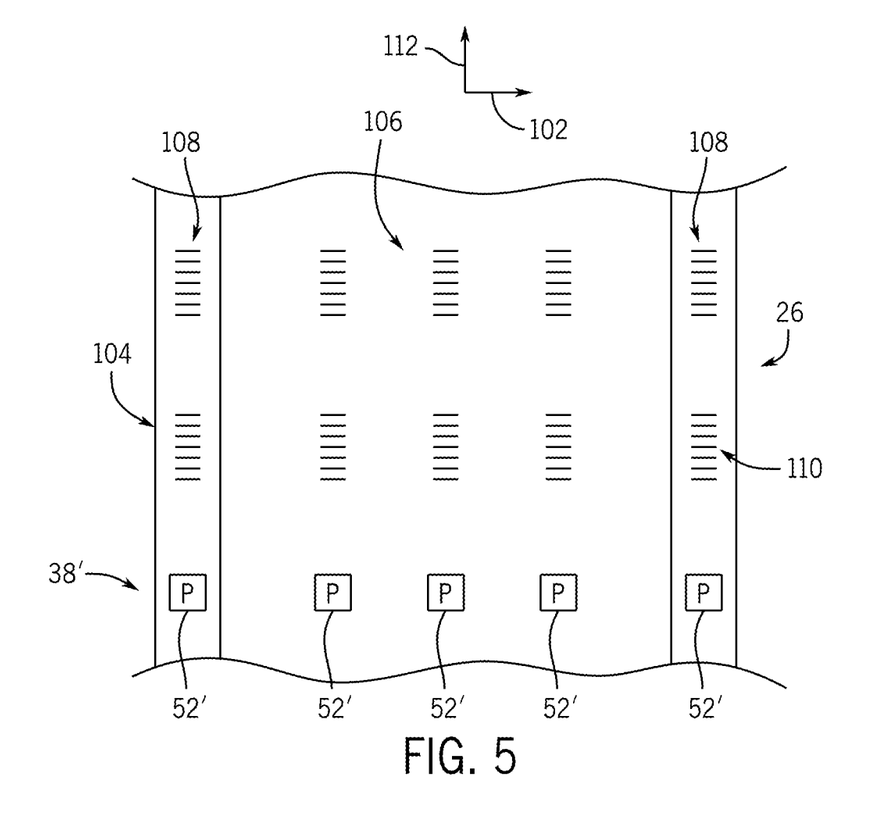
FIG. 5 is a schematic diagram of a portion of an embodiment of an identification printing system that may be employed within the agricultural system of FIG. 1.

FIG. 5 is a schematic diagram of a portion of an embodiment of the identification printing system 38' that may be employed within the agricultural system of FIG. 1 (e.g., the identification printing system 38' disclosed above with reference to FIG. 4). In the illustrated embodiment, the identification printing system 38' includes multiple print heads 52' positioned between the bale wrap assembly and the bale. As previously discussed, the bale wrap assembly is configured to provide the bale wrap 26 to the bale wrapping system. Furthermore, as previously discussed, the bale wrapping system is configured to wrap the bale with the bale wrap 26. The print heads 52' are configured to print identification information unto a portion of the bale wrap 26 after the portion of the bale wrap 26 disengages the shaft of the bale wrap assembly and before the portion of the bale wrap 26 engages the bale. As previously discussed, the identification information may facilitate identification and tracking of the wrapped bale.

In the illustrated embodiment, the identification printing system 38' includes multiple print heads 52' distributed across a width 102 of the bale wrap 26. Accordingly, the identification information 104 may be printed in multiple locations across the width 102 of the bale wrap 26, thereby enhancing the visibility/readability of the identification information 104. In the illustrated embodiment, the identification printing system 38' include first print heads 52' configured to print the identification information 104 onto a central section 106 of the bale wrap 26, such that the identification information 104 is located on a circumferential surface (e.g., outer circumferential surface) of the bale wrap 26 when the bale wrap is wrapped around the bale. While the identification printing system 38' includes three first print heads 52' configured to print the identification information 104 onto the central section 106 of the bale wrap 26 in the illustrated embodiment, in other embodiments, the identification printing system may include more or fewer first print heads 52' configured to print the identification information 104 onto the central section of the bale wrap 26 (e.g., 0, 1, 2, 4, 5, 6, 7, 8, or more).

In addition, in the illustrated embodiment, the identification printing system 38' includes second print heads 52' configured to print the identification information 104 onto laterally outward sections 108 of the bale wrap 26, such that the identification information 104 is located on each shoulder (e.g., outer shoulder surface) of the bale wrap 26 when the bale wrap is wrapped around the bale. In the illustrated embodiment, the identification printing system 38' includes one second print head 52' configured to print the identification information 104 onto each laterally outward section 108 of the bale wrap 26. However, in other embodiments, the identification printing system 38' may include more or fewer second print heads 52' configured to print the identification information 104 onto each laterally outward section 108 of the bale wrap 26 (e.g., 0, 2, 3, 4, or more). Because the identification information 104 is located on the circumferential surface of the wrapped bale and on the shoulder of the wrapped bale, the identification information 104 may be visible/readable from multiple positions of the viewer/reader.

In the illustrated embodiment, each instance of the identification information 104 includes a bar code 110. In addition, each print head 52' is configured to print each respective bar code 110 along a length 112 of the bale wrap 26, such that the bars of the bar code 110 are spaced apart from one another along the length 112 of the bale wrap 26 (e.g., along the direction of movement of the bale wrap from the bale wrap assembly toward the bale). Accordingly, each bar code 110 may be readable by a laser scanner even as the bale wrap stretches in a lateral direction and/or distorts. However, in other embodiments, at least one print head may be configured to print the bar code along the width of the bale wrap. For example, in certain embodiments, print head(s) may print bar codes along the length of the bale wrap and along the width of the bale wrap. While each instance of the identification information 104 includes a bar code 110 in the illustrated embodiment, in other embodiments, at least one instance of the identification information may include a QR code and/or text (e.g., alone or in combination with the bar code).

In certain embodiments (e.g., in embodiments in which print head(s) 52' are arranged to print the identification information 104 onto the bale wrap 26, such that the identification information 104 appears on an outwardly-facing surface of the bale wrap when the bale wrap 26 is wrapped around the bale), at least one print head 52' (e.g., each print head 52' of the identification printing system 38') is laterally positioned such that at least a portion of the printed identification information 104 is positioned laterally between adjacent belts during the bale wrapping process or such that at least a portion of the printed identification information 104 is positioned laterally outwardly from an outermost belt (e.g., between an outermost belt and a side wall of the cavity) during the bale wrapping process. As previously discussed, the belt(s) circulate around the path defined by the rollers and the bale, thereby capturing the agricultural product from the accumulator and drawing the agricultural product into the cavity. In certain embodiments, the baler includes multiple belts that are laterally spaced apart from one another along a lateral extent (e.g., width) of the bale (e.g., crosswise to the direction of rotation of the bale). In such embodiments, at least one print head 52' may be laterally positioned between adjacent belts or in another suitable location that enables the print head(s) 52' to print the identification information 104 onto the bale wrap 26, such that at least a portion of the identification information 104 is positioned laterally between the adjacent belts during the bale wrapping process. Because at least a portion of the identification information 104 does not contact the belts, the material (e.g., ink) forming the identification information 104 may have additional time to dry before the bale leaves the cavity, thereby substantially reducing or eliminating the possibility of the portion of the identification information 104 becoming distorted (e.g., smeared) due to contact between the identification information 104 and the belts. Additionally or alternatively, at least one print head 52' may be positioned laterally outwardly from an outermost belt (e.g., between an outermost belt and a side wall of the cavity) or in another suitable location that enables the print head(s) 52' to print the identification information 104 onto the bale wrap 26, such that at least a portion of the identification information 104 is positioned laterally outwardly from the outermost belt during the bale wrapping process. Because at least a portion of the identification information 104 does not contact the belt(s), the material (e.g., ink) forming the identification information 104 may have additional time to dry before the bale leaves the cavity, thereby substantially reducing or eliminating the possibility of the portion of the identification information 104 becoming distorted (e.g., smeared) due to contact between the identification information 104 and the belt(s).

Furthermore, in the illustrated embodiment, the print heads 52' are configured to print the identification information 104 in multiple locations along the length 112 of the bale wrap 26, such that the identification information 104 is positioned in multiple locations along the circumferential surface of the bale wrap 26 when the bale wrap is wrapped around the bale. Because the identification information 104 is printed in multiple locations on the circumferential surface of the bale wrap 26, the identification information 104 may be visible/readable while the wrapped bale is in any orientation (e.g., at least one instance of the identification information 104 may not be positioned between the wrapped bale and the field). In addition, in the illustrated embodiment, the print heads 52' are configured to print the identification information 104 in multiple locations along the length 112 of the bale wrap 26, such that the identification information 104 is positioned in multiple locations along the shoulders of the bale wrap 26 when the bale wrap is wrapped around the bale. As previously discussed, the print heads 52' are configured to print the identification information 104 onto a portion of the bale wrap 26 after the portion of the bale wrap 26 disengages the shaft of the bale wrap assembly and before the portion of the bale wrap 26 engages the bale. Accordingly, to print the identification information 104 in multiple locations along the length 112 of the bale wrap 26, the controller may control the print head(s) 52' to print the identification information 104 onto multiple portions. While the print heads 52' are configured to print the identification information 104 in multiple locations on the central section 106 and on the laterally outward sections 108 along the length 112 of the bale wrap 26 in the illustrated embodiment (e.g., the controller is configured to control the print heads 52' to print the identification information 104 in multiple locations on the center section 106 and on the laterally outward sections 108 along the length 112 of the bale wrap 26), in other embodiments, at least one print head 52' may be configured to print the identification information 104 in one location along the length 112 of the bale wrap 26 (e.g., the controller may be configured to control the at least one print head 56' to print the identification information 104 in one location along the length 112 of the bale wrap 26).

As used herein with regard to the position(s) of the print head(s) 52', "between the bale wrap assembly and the bale" is exclusive of the bale wrap assembly and the bale. However, in certain embodiments, at least one print head may be positioned at the bale wrap assembly. For example, print head(s) may be positioned radially outwardly from the shaft of the bale wrap assembly, and biasing system(s) and/or actuation system(s) may cause the print head(s) to engage the bale wrap while the bale wrap is disposed about the shaft of the bale wrap assembly. For example, each biasing system may include biasing member(s) (e.g., spring(s), pneumatic cylinder(s), etc.) configured to urge a respective print head against the bale wrap, thereby enabling the respective print head to print the identification information onto the bale wrap. Furthermore, each actuation system may include actuator(s) (e.g., electric linear actuator(s), hydraulic cylinder(s), etc.) configured to drive a respective print head against the bale wrap, thereby enabling the respective print head to print the identification information onto the bale wrap. The print head(s) positioned at the bale wrap assembly are configured to print the identification information onto the bale wrap while the bale wrap is engaged with the shaft of the bale wrap assembly. In certain embodiments, the identification printing system may only include print head(s) positioned at the bale wrap assembly, the identification printing system may only include print head(s) positioned between the bale wrap assembly and the bale, or the identification printing system may include print heads positioned at the bale wrap assembly and between the bale wrap assembly and the bale.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An identification printing system for a wrapped agricultural bale, comprising:
 a controller comprising a memory and a processor, wherein the controller is configured to:
  control a bale rotation system to drive the wrapped agricultural bale to rotate within a bale carrier of a baler, wherein the bale rotation system comprises at least one roller;
  control a print head to print identification information onto an outer circumferential surface of a bale wrap of the wrapped agricultural bale in a plurality of locations as the wrapped agricultural bale is rotating;
  control the bale rotation system to terminate rotation of the wrapped agricultural bale before the identification information engages the at least one roller; and
  control an ejection system to eject the wrapped agricultural bale from the baler a target duration after terminating rotation of the wrapped agricultural bale.

2. The identification printing system of claim 1, wherein the bale wrap comprises a natural material, and the print head is configured to print on the natural material.

3. The identification printing system of claim 1, wherein the identification information comprises a machine-readable code.

4. The identification printing system of claim 1, wherein the plurality of locations comprises at least three locations, and the controller is configured to control the print head to print the identification information in the at least three locations at least 60 degrees away from one another with respect to a circumferential axis of the wrapped agricultural bale.

5. The identification printing system of claim 1, wherein the controller is configured to:
 control a print actuation system to drive the print head into engagement with the bale wrap before controlling the print head to print the identification information; and
 control the print actuation system to drive the print head to disengage the bale wrap.

6. The identification printing system of claim 1, wherein the controller is configured to determine the target duration via machine learning.

7. A baler, comprising:
 a bale rotation system configured to drive a wrapped agricultural bale to rotate within a bale carrier of the baler, wherein the bale rotation system comprises at least one roller;
 an ejection system configured to eject the wrapped agricultural bale from the baler; and an identification printing system, comprising:
- a print head configured to print identification information onto an outer circumferential surface of a bale wrap of the wrapped agricultural bale; and
- a controller comprising a memory and a processor, wherein the controller is communicatively coupled to the bale rotation system, to the print head, and to the ejection system, wherein the controller is configured to:
  - control the bale rotation system to drive the wrapped agricultural bale to rotate within the bale carrier;
  - control the print head to print the identification information onto the outer circumferential surface of the bale wrap in a plurality of locations as the wrapped agricultural bale is rotating;
  - control the bale rotation system to terminate rotation of the wrapped agricultural bale before the identification information engages the at least one roller; and
  - control the ejection system to eject the wrapped agricultural bale from the baler a target duration after terminating rotation of the wrapped agricultural bale.

8. The baler of claim 7, wherein the identification printing system comprises a print actuation system communicatively coupled to the controller, wherein the print actuation system is configured to move the print head relative to the bale wrap, and the controller is configured to:
- control the print actuation system to drive the print head into engagement with the bale wrap before controlling the print head to print the identification information; and
- control the print actuation system to drive the print head to disengage the bale wrap.

9. The baler of claim 7, wherein the bale wrap comprises plastic, and the print head is configured to print on the plastic.

10. The baler of claim 7, wherein the identification information comprises a machine-readable code.

11. The baler of claim 10, wherein the identification printing system comprises a sensor configured to output a sensor signal indicative of the identification information, wherein the sensor is communicatively coupled to the controller, and the controller is configured to verify the accuracy of the identification information based on the sensor signal.

12. An identification printing system for a wrapped agricultural bale, comprising:
- a controller comprising a memory and a processor, wherein the controller is configured to:
  - control a bale rotation system to drive the wrapped agricultural bale to rotate within a bale carrier of a baler;
  - control a print head to print identification information onto an outer circumferential surface of a bale wrap of the wrapped agricultural bale in a plurality of locations as the wrapped agricultural bale is rotating;
  - control the bale rotation system to terminate rotation of the wrapped agricultural bale;
  - determine a target duration between terminating rotation of the wrapped agricultural bale and ejection of the wrapped agricultural bale from the baler based on a type of ink used by the print head or one or more environmental conditions; and
  - control an ejection system to eject the wrapped agricultural bale from the baler the target duration after terminating rotation of the wrapped agricultural bale.

13. The identification printing system of claim 12, wherein the controller is configured to determine the target duration based on the type of ink used by the print head and the one or more environmental conditions.

14. The identification printing system of claim 12, wherein the one or more environmental conditions comprise precipitation, humidity, temperature, or a combination thereof.

15. The identification printing system of claim 12, wherein the controller is configured to determine the target duration via machine learning.

16. The identification printing system of claim 12, wherein the bale wrap comprises a natural material, and the print head is configured to print on the natural material.

17. The identification printing system of claim 12, wherein the identification information comprises a machine-readable code.

18. The identification printing system of claim 12, wherein the plurality of locations comprises at least three locations, and the controller is configured to control the print head to print the identification information in the at least three locations at least 60 degrees away from one another with respect to a circumferential axis of the wrapped agricultural bale.

19. The identification printing system of claim 12, wherein the controller is configured to:
- control a print actuation system to drive the print head into engagement with the bale wrap before controlling the print head to print the identification information; and
- control the print actuation system to drive the print head to disengage the bale wrap.

20. The identification printing system of claim 12, wherein the bale rotation system comprises at least one roller, and the controller is configured to control the bale rotation system to terminate rotation of the wrapped agricultural bale before the identification information engages the at least one roller.

* * * * *